(12) United States Patent
Hinkel et al.

(10) Patent No.: US 8,427,136 B2
(45) Date of Patent: Apr. 23, 2013

(54) MAGNETIC DISPLACEMENT SENSOR

(75) Inventors: Gerhard Hinkel, Igensdorf (DE);
Michael Nagel, Nürnberg (DE);
Andreas Schulze, Lauf (DE); Roger Pohlmann, Fürth-Stadeln (DE); Bernd Seitz, Nürnberg (DE)

(73) Assignee: Conti Temic Microelectronic GmbH (DE)

( * ) Notice: Subject to any disclaimer, the term of this patent is extended or adjusted under 35 U.S.C. 154(b) by 369 days.

(21) Appl. No.: 12/919,932

(22) PCT Filed: Mar. 6, 2009

(86) PCT No.: PCT/DE2009/000297
§ 371 (c)(1),
(2), (4) Date: Nov. 8, 2010

(87) PCT Pub. No.: WO2009/109177
PCT Pub. Date: Sep. 11, 2009

(65) Prior Publication Data
US 2011/0043195 A1    Feb. 24, 2011

(30) Foreign Application Priority Data
Mar. 7, 2008  (DE) .................. 10 2008 013 286

(51) Int. Cl.
*G01R 33/00* (2006.01)
(52) U.S. Cl.
USPC .................. 324/207.11; 324/207.23; 324/200
(58) Field of Classification Search ........................ None
See application file for complete search history.

(56) References Cited

U.S. PATENT DOCUMENTS

| | | | | |
|---|---|---|---|---|
| 6,448,760 | B1 * | 9/2002 | Neumann et al. | 324/207.2 |
| 6,753,681 | B2 * | 6/2004 | Enomoto et al. | 324/207.25 |
| 7,339,371 | B2 * | 3/2008 | Shimomura et al. | 324/207.25 |

FOREIGN PATENT DOCUMENTS

| | | |
|---|---|---|
| EP | 1 553 387 A1 | 7/2005 |
| WO | WO 02/21080 A1 | 3/2002 |
| WO | WO 2004/074853 A2 | 9/2004 |

* cited by examiner

*Primary Examiner* — Melissa Koval
*Assistant Examiner* — Trung Nguyen
(74) *Attorney, Agent, or Firm* — RatnerPrestia

(57) ABSTRACT

A magnetic displacement sensor, where, in order to achieve an improved measurement behavior, magnets are formed in a direction of an x-axis such that a z-component ($B_z$) of the flux density has an essentially linear characteristic curve in a region of travel and/or the magnets are formed in a direction of a y-axis such that the z-component ($B_z$) is essentially constant in a region of a transversal offset.

16 Claims, 7 Drawing Sheets

MAGNETIC DISPLACEMENT SENSOR

CROSS REFERENCE TO RELATED APPLICATIONS

This application is the U.S. national phase application of PCT International Application No. PCT/DE2009/000297, filed Mar. 6, 2009, which claims priority to German Patent Application No. 10 2008 013 286.1, filed Mar. 7, 2008, the contents of such application being incorporated by reference herein.

FIELD OF THE INVENTION

The invention relates to a magnetic displacement sensor.

BACKGROUND OF THE INVENTION

Known magnetic displacement sensors are used for contactless displacement measurement. They comprise a magnetic transmitter and a magnetic flux density sensor, which are arranged at a distance of an air gap to each other and which are moveable relative to each other. The magnetic transmitter comprises two magnets arranged on a magnet carrier, which are cube-shaped. The magnetic flux density sensor evaluates the z-component of the flux density and thus supplies a measure for the displacement to be measured. The displacement to be measured is supposed to be determined as accurate as possible, so that with magnetic displacement sensors there is a continuous desire for an improved measurement behavior.

SUMMARY OF THE INVENTION

It is, therefore, an object of the invention to create a magnetic displacement sensor with an improved measurement behavior.

This object is achieved by a magnetic displacement sensor which is described herein. According to aspects of the invention it was recognized that an improved measurement behavior can be achieved, if the magnets are formed in the direction of the x-axis (x-direction) and/or in the direction of the y-axis (y-direction). By the targeted shaping in the x-direction the z-component of the flux density can be linearized in the region of travel in the x-direction of the displacement sensor. Thus, the displacement sensor comprises a linear characteristic curve for the z-component with an allowable maximum flux density within the desired travel. By means of this, at each position of the travel the same maximum resolution of the displacement sensor can be ensured. Furthermore, control systems based on the displacement measurement can be designed more simple, since the characteristic curve runs linear. By the targeted shaping in the y-direction in the region of the transverse offset caused by assembly tolerances it can be achieved in the y-direction that the z-component is essentially constant. Consequently, the linear characteristic curve is essentially independent of the transverse offset of the magnets in the y-direction. This provides for a high robustness and insensitivity towards assembly tolerances. Depending upon the requirements the shaping can take place alternatively in the x- and/or y-direction.

A displacement sensor according to aspects of the invention provides for a simple shaping in the x-direction. Due to the fact that the z-measurement of the magnets, i.e. the magnet thickness, decreases towards the direction of the y-axis, the magnets show a larger magnet thickness at the edge facing away from the y-axis than at the edge facing the y-axis. By way of this, the flattening of the characteristic curve of the z-component at the edges of the travel are compensated.

A displacement sensor according to aspects of the invention provides for a simple shaping in the y-direction. Due to the fact that the z-measurement of the magnets, i.e. the magnet thickness, decreases towards the direction of the x-axis, the magnets show a larger magnet thickness at the edges facing away from the x-axis than in the region of the x-axis. By way of this, a decline of the z-component of the flux density towards the edges is compensated, whereby the characteristic curve of the z-component is essentially independent of the position of the magnets in the y-direction. A transverse offset of the magnets thus causes no change of the z-component, as its characteristic curve is essentially constant in the y-direction.

A displacement sensor according to aspects of the invention can be produced in simple manner.

A displacement sensor according to aspects of the invention provides for a simply producible shaping in the x- and y-direction.

A displacement sensor according to aspects of the invention comprises an improved field profile of the z-component, since the magnets taper in the z-direction.

A displacement sensor according to aspects of the invention comprises a defined field profile of the z-component and is simultaneously simply producible, since the magnets taper in the z-direction and comprise a narrow and simply producible edge.

A displacement sensor according to aspects of the invention allows for a defined adjustment of the z-component in x- and y-direction. Here, the inner profile edge can run in particular convex or concave.

A displacement sensor according to aspects of the invention allows for a defined field profile adjustable as required with a simultaneously simple producibility of the magnets.

A displacement sensor according to aspects of the invention allows for a shaping in the x- and y-direction which is independent from each other. The inner profile edges preferably have the same form and are formed for example linear. The path can be for example a rectangle half, a semicircle or an ellipse half. With the rectangle half the transition between the cross sectional profiles is discrete or continuous. With the semicircle or the ellipse half the transition between the cross sectional profiles is continuous. The cross sectional profiles can be formed in accordance with aspects of the invention.

A displacement sensor according to aspects of the invention comprises a high mechanical stability.

A displacement sensor according to aspects of the invention is simply constructed. In particular, no common carrier for the magnets is required, since they are self-supporting.

A displacement sensor according to aspects of the invention increases the useful field on the side of the flux density sensor.

A displacement sensor according to aspects of the invention is constructed in simple and compact manner. In particular, in the region of the flux density sensor there is a high useful field, saving magnetic material.

Further features, advantages and details of the invention will become apparent from the subsequent description of several examples of embodiment.

BRIEF DESCRIPTION OF THE DRAWINGS

The invention is best understood from the following detailed description when read in connection with the accompanying drawings. Included in the drawings are the following figures.

DETAILED DESCRIPTION OF THE PREFERRED EMBODIMENTS

Figure 1:
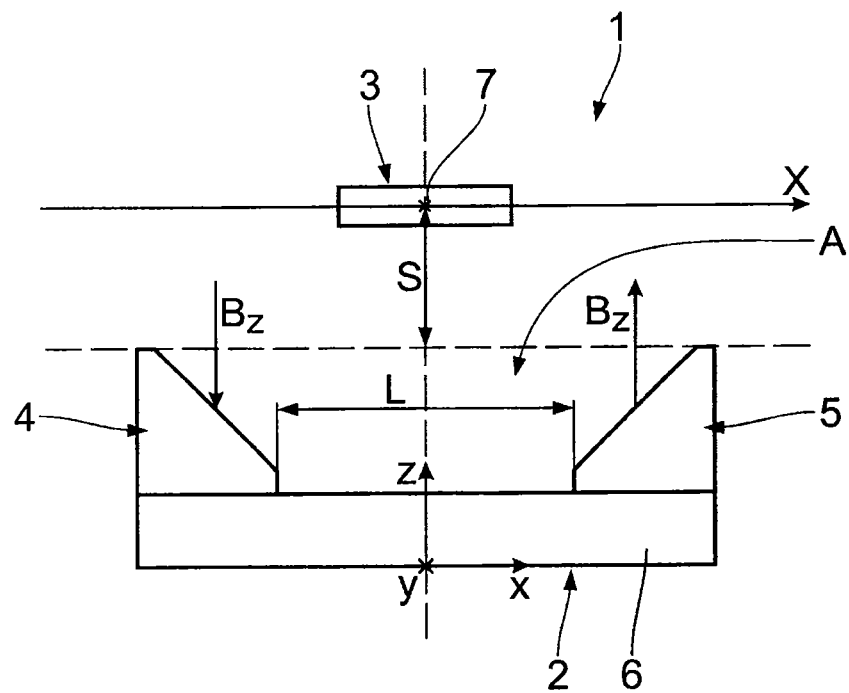
FIG. 1 shows a side view of a magnetic displacement sensor in accordance with a first example of embodiment.
Figure 2:
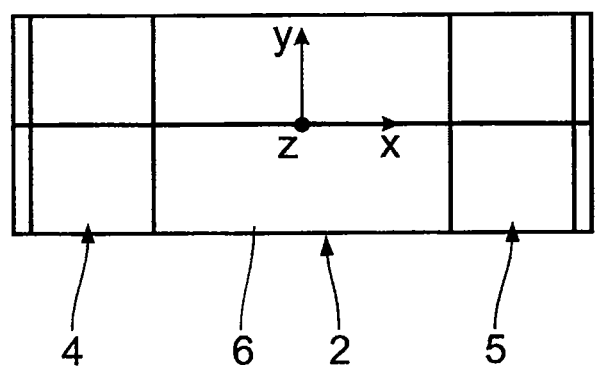
FIG. 2 shows a plan view on a magnetic transmitter of the displacement sensor in FIG. 1.
Figure 3:
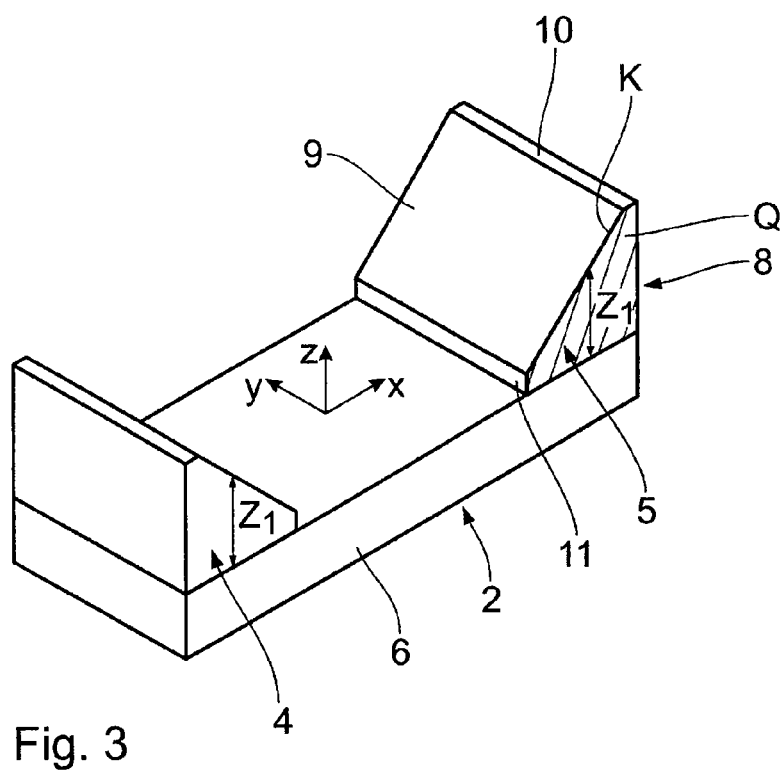
FIG. 3 shows a perspective view of the magnetic transmitter in FIG. 2.

In the following, while referring to FIGS. 1 to 4, a first example of embodiment of the invention is described. A magnetic displacement sensor 1 comprises a magnetic transmitter 2 and an associated magnetic flux density sensor 3. In order to form a magnetic field the magnetic transmitter 2 comprises a first magnet 4 formed as a permanent magnet and a second magnet 5 formed as a permanent magnet, which in a rest—shown in FIGS. 1 and 2—are arranged essentially centrally along an x-axis on a magnet carrier 6. Moreover, the magnets 4, 5 in the rest are arranged axially symmetrically to a y-axis on the magnet carrier 6. Thus, the y-axis runs in the rest essentially centrally between the magnets 4, 5. The magnets 4, 5 have a magnet distance L in the direction of the x-axis (hereinafter x-direction). In the direction of a z-axis running vertically to the x- and y-axis the flux density sensor 3 is distanced from the magnetic transmitter 2. The distance is referred to as air gap S. The flux density sensor 3 is formed as a Hall sensor and comprises a sensitive region 7, in the state of rest located on the z-axis, for measuring a z-component of the flux density of the magnetic field running in direction to the z-axis (hereinafter z-direction). The z-component is hereinafter referred to as $B_z$.

The magnet carrier 6 is made of a soft magnetic material and reinforces the useful field, i.e. the z-component $B_z$, on the side of the flux density sensor 3.

The magnetic transmitter 2 and the flux density sensor 3 are displaceable relative to each other in the x-direction, the flux density sensor 3 measuring in different x-positions different z-components. In this manner, a measurement of the path X in the x-direction via a travel $\Delta X$ of the displacement sensor 1 is possible by means of the displacement sensor 1.

The magnets 4, 5 define a receiving area A. The flux density sensor 3 is arranged outside of the receiving area A. Alternatively, the flux density sensor 3 can be partially arranged in the receiving area A.

Figure 4:
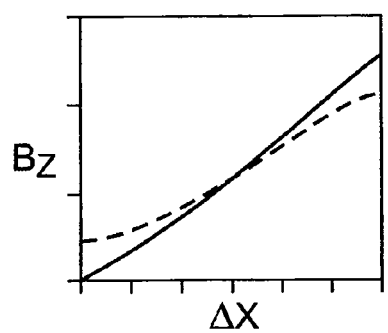
FIG. 4 shows a characteristic curve of the z-component of the flux density.

The magnets 4, 5 are formed in the x-direction in such a manner that the z-component $B_z$ comprises in the region of the travel $\Delta X$ an essentially linear characteristic curve, as it is shown in FIG. 4. For this purpose, the magnets 4, 5 are formed wedge-shaped, so that a first z-measurement $Z_1$ of the magnets 4, 5 running in the z-direction decreases towards the y-axis. Each magnet 4, 5 forms a profile body 8, which comprises an associated cross sectional profile Q with an inner profile edge K. The cross sectional profile Q is a pentagon with three right angles. The associated inner profile edge K runs linear. The profile body 8 is thus formed as a wedge with an inclined surface 9 running in an acute angle to the x-y plane as well as a first edge surface 10 running parallel to the x-y plane and a second edge surface 11 running parallel to the y-z-plane.

Based on the fact that the magnets 4, 5 in the region of the first edge surface 10 have a larger z-measurement $Z_1$, i.e. a larger material thickness, than in the region of the second edge surface 11, via the travel $\Delta X$ a linear profile of the z-component $B_z$ is achieved. In FIG. 4 the linear course achieved by the magnets 4, 5 according to aspects of the invention is shown in solid line, whereas the profile achieved by conventional displacement sensors is shown in dashed line.

Figure 5:
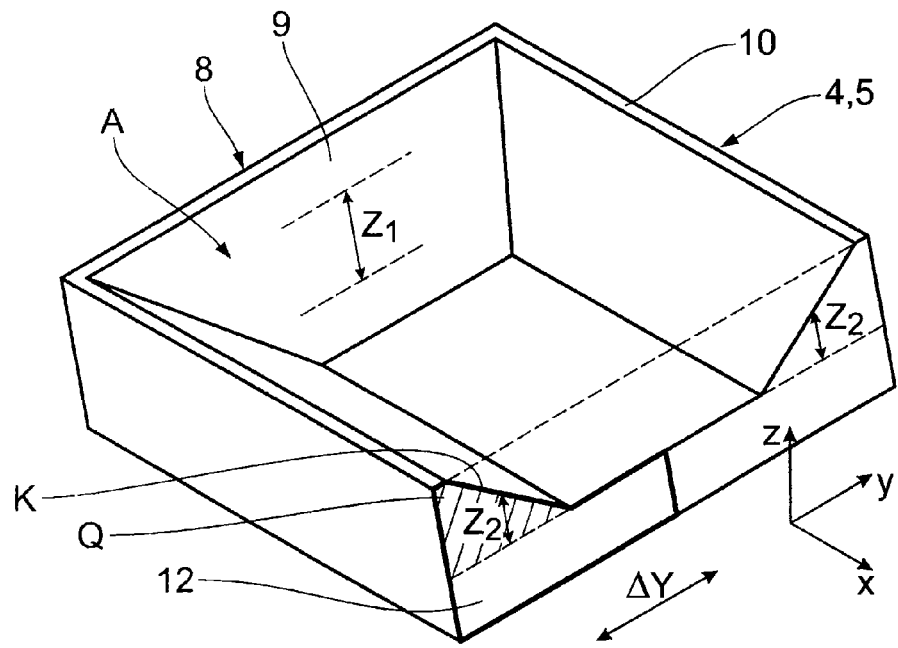
FIG. 5 shows a perspective view of a magnet in accordance with a second example of embodiment.
Figure 6:
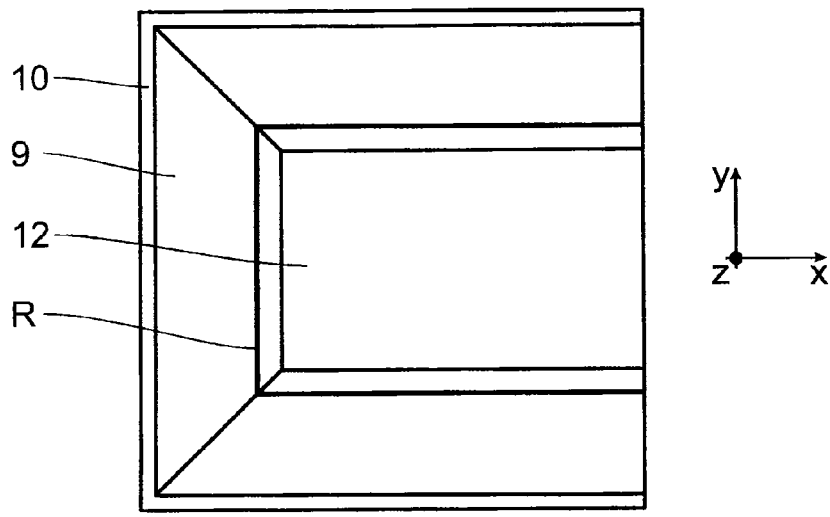
FIG. 6 shows a plan view on the magnet in FIG. 5.

In the following while referring to FIGS. 5 and 6 a second example of embodiment of the invention is described.

The magnets 4, 5 comprise a bottom 12 and the profile body 8 arranged on it. The magnets 4, 5 are formed integrally with each other. The magnets 4, 5 are formed in the x-direction in such a manner that the z-component $B_z$ comprises in the region of the travel $\Delta X$ an essentially linear characteristic curve according to the first example of embodiment. Moreover, the magnets 4, 5 are formed in the direction of the y-axis (hereinafter y-direction) in such a manner that the z-component $B_z$ in the region of a transverse offset $\Delta Y$ is essentially constant in the y-direction. For this purpose, each magnet 4, 5 is formed in the y-direction in such a manner that a second z-measurement $Z_2$ running in the z-direction decreases towards the x-axis. The profile body 8 is formed in such a manner that the cross sectional profile Q, which is a square with two right angles and a linear inner profile edge K, is drawn along a path in form of a rectangle half R. This results in a U-shaped inclined surface 9 and a U-shaped first edge surface 10.

The magnets 4, 5 define the receiving area A, which is limited by the profile body 8 and the bottom 12. The flux density sensor 3 can be either arranged at the distance S outside of the receiving area A. Alternatively, the flux density sensor 3 can be arranged at least partially in the receiving area A. As for the further mode of operation reference is made to the preceding example of embodiment.

Figure 7:
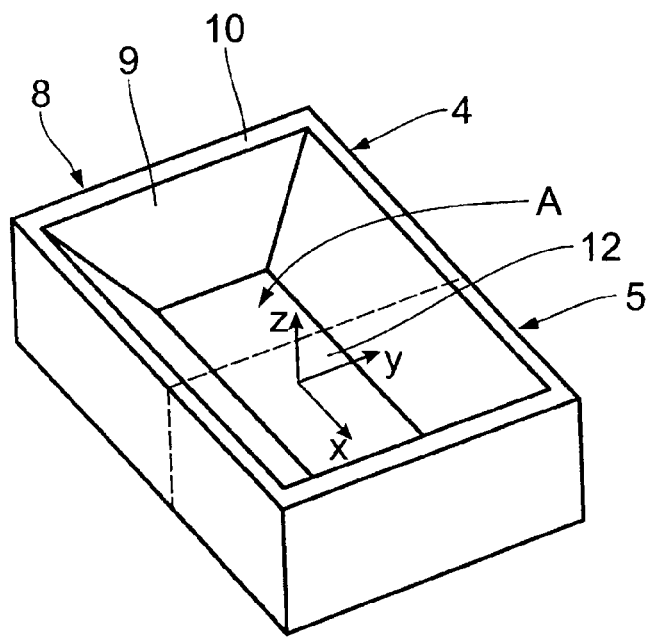
FIG. 7 shows a perspective view of two magnets in accordance with a third example of embodiment.

In the following, while referring to FIG. 7 a third example of embodiment of the invention is described. In contrast to the preceding examples of embodiment the magnets 4, 5 are formed integrally. As for the further mode of operation reference is made to the preceding examples of embodiment.

Figure 8:
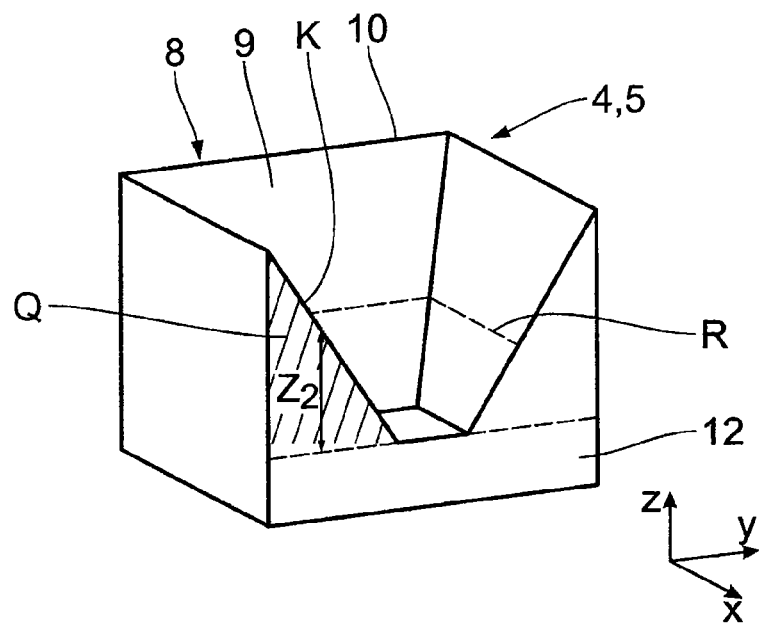
FIG. 8 shows a perspective view of a magnet in accordance with a fourth example of embodiment.

In the following, while referring to FIG. 8 a fourth example of embodiment of the invention is described. In contrast to the second and third example of embodiment the cross sectional profile Q is a triangle. This results in that the first edge surface 10 produces a—mathematically considered—U-shaped edge. By way of this, the field profile can be improved.

Figure 9:
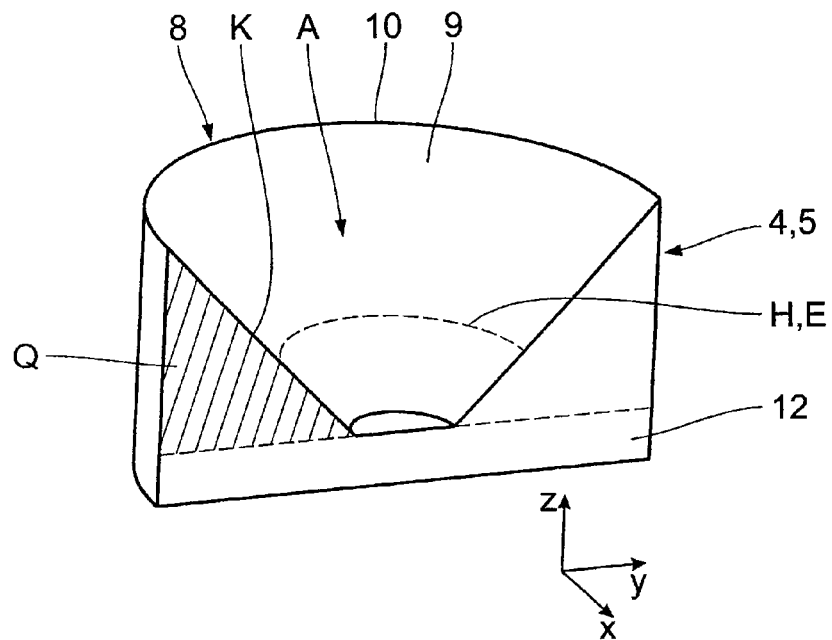
FIG. 9 shows a perspective view of a magnet in accordance with a fifth example of embodiment.

In the following, while referring to FIG. 9 a fifth example of embodiment of the invention is described. In contrast to the preceding examples of embodiment the profile body 8 is generated in such a manner that the triangular cross sectional profile Q is drawn with the linear inner profile edge K along a semicircle H. Alternatively, the cross sectional profile Q can be drawn along an ellipse half E. As for the further mode of operation reference is made to the preceding examples of embodiments.

Figure 10:
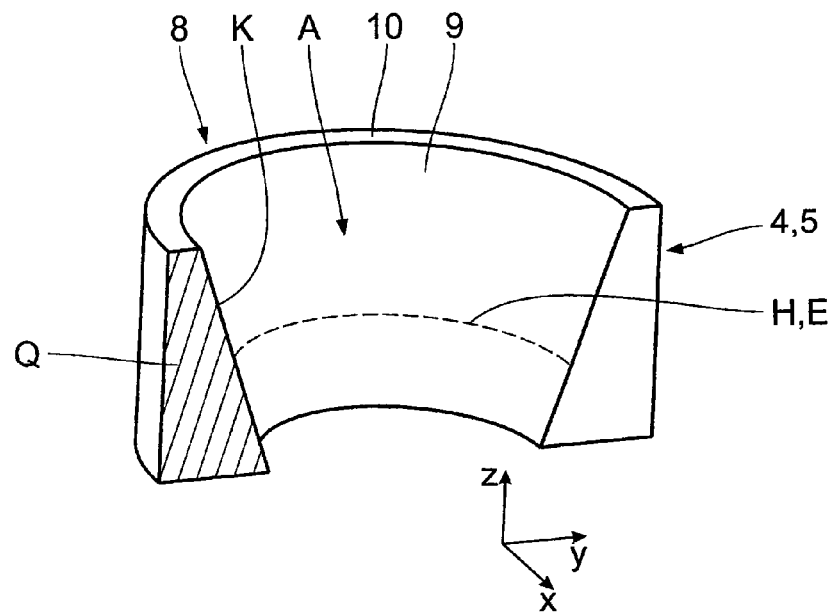
FIG. 10 shows a perspective view of a magnet in accordance with a sixth example of embodiment.

In the following, while referring to FIG. 10 a sixth example of embodiment of the invention is described. In contrast to the preceding examples of embodiment the magnets 4, 5 do not comprise a bottom. The profile body 8 thus corresponds to the magnets 4, 5. The cross sectional profile Q, which is a square with two right angles and a linear inner profile edge K, is drawn along the semicircle H. Alternatively, the cross sectional profile Q can be drawn along the ellipse half E. As for the further mode of operation reference is made to the preceding examples of embodiment.

Figure 11:
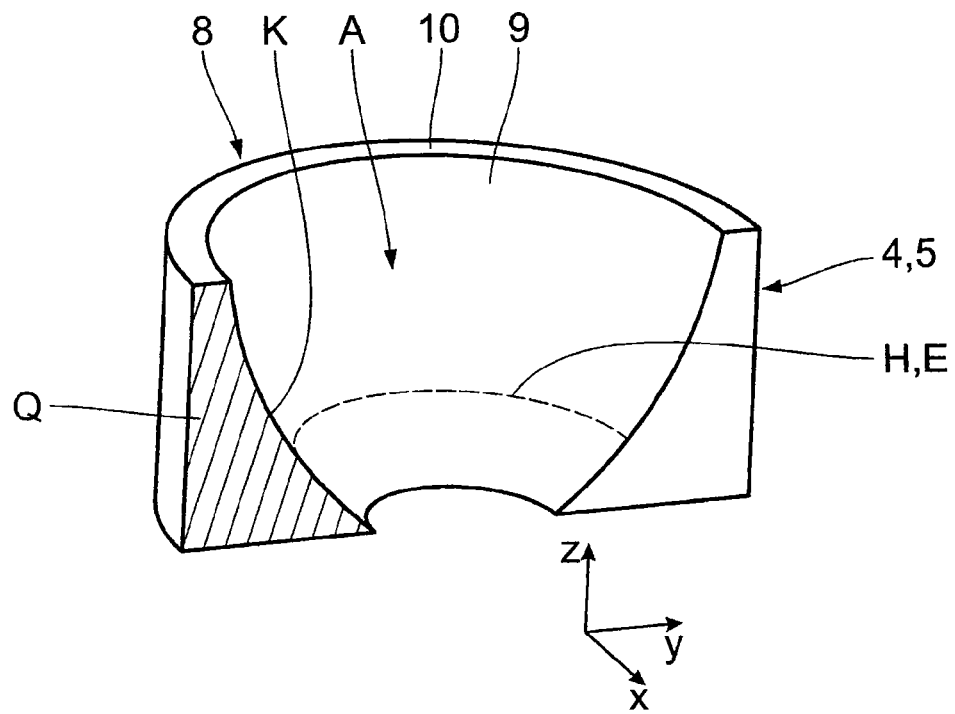
FIG. 11 shows a perspective view of a magnet in accordance with a seventh example of embodiment.

In the following, while referring to FIG. 11 a seventh example of embodiment of the invention is described. In contrast to the preceding examples of embodiment the cross sectional profile Q, which is formed as a square with two right angles, comprises a nonlinear inner profile edge K. With increasing distance from the x- and/or y-axis the inner profile edge K runs increasingly steeper. As for the further mode of operation reference is made to the preceding examples of embodiments.

Figure 12:
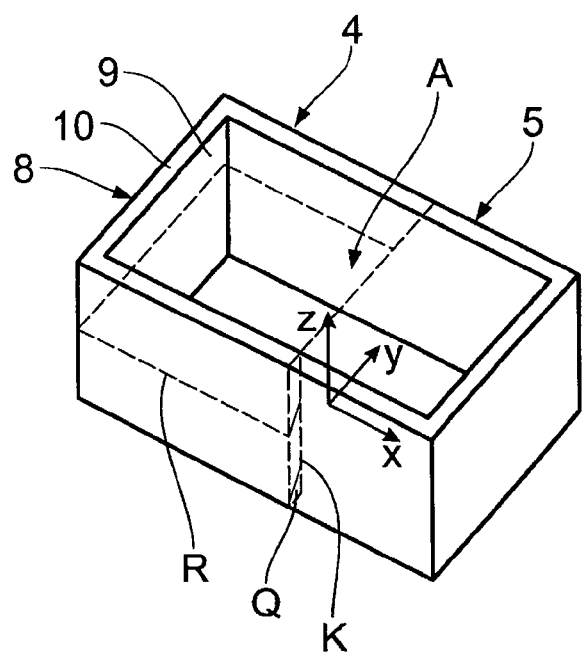
FIG. 12 shows a perspective view of a magnet in accordance with an eighth example of embodiment.

In the following, while referring to FIG. 12 an eighth example of embodiment of the invention is described. In contrast to the preceding examples of embodiment the profile body 8 is formed in such a manner that the cross sectional profile Q comprises the form of a rectangle with a linear inner profile edge K, the rectangle being drawn along the rectangle half R. The magnets 4, 5 are formed integrally and do not have a bottom. The magnets 4, 5 thus form a rectangular frame with an inclined surface 9 running essentially vertically to the x-y plane. As for the further mode of operation reference is made to the preceding examples of embodiment.

Figure 13:
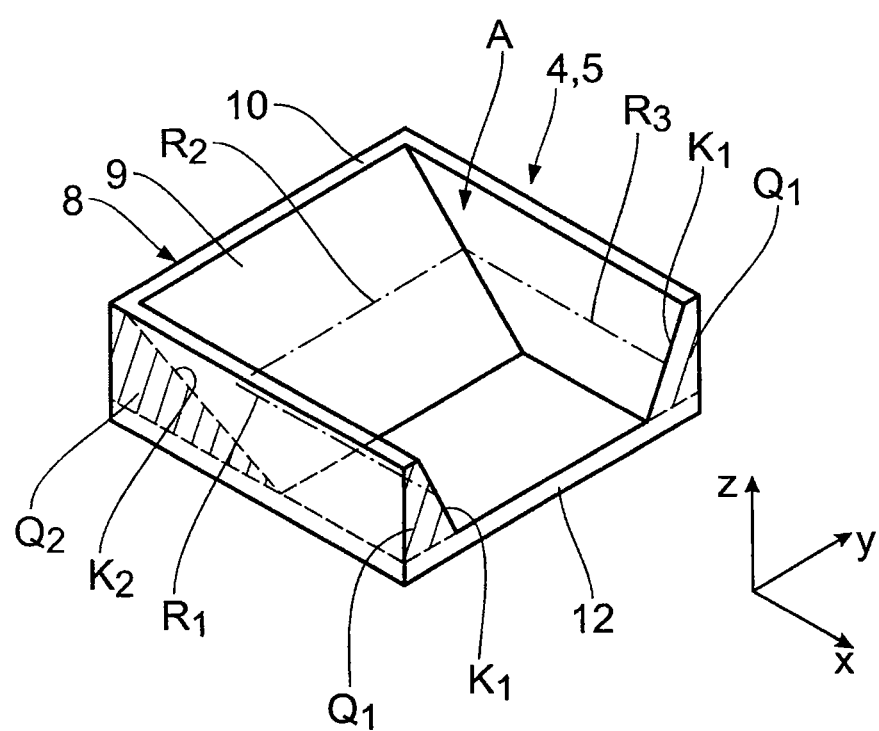
FIG. 13 shows a perspective view of a magnet in accordance with a ninth example of embodiment.

In the following, while referring to FIG. 13 a ninth example of embodiment of the invention is described. In contrast to the preceding examples of embodiment the profile body 8 is formed by a first cross sectional profile $Q_1$ with a first inner profile edge $K_1$ and a second cross sectional profile $Q_2$ differing therefrom with a second inner profile edge $K_2$. The cross sectional profiles $Q_1$ and $Q_2$ have the form of a square with two essentially right angles. The inner profile edge $K_1$ and $K_2$ are linear, the inner profile edge $K_1$ running steeper compared with the inner profile edge $K_2$. The profile body 8 is formed in such a manner that the first cross sectional profile $Q_1$ is drawn in the x-direction along two parallel linear sections $R_1$ and $R_3$ and the second cross sectional profile $Q_2$ along a linear section $R_2$ running vertically thereto of a path R. The path R has the form of a rectangle half. The transition between the cross sectional profiles $Q_1$ and $Q_2$ is discrete. As for the further mode of operation reference is made to the preceding examples of embodiment.

In principle, the following shall apply:

The magnets 4, 5 are formed in the x-direction such that a linear characteristic curve with an allowable maximum flux density $B_z$ is generated within the required travel $\Delta X$. The magnets 4, 5 are formed additionally or alternatively in the y-direction in such a manner that a flux density decrease by transverse offset $\Delta Y$ does not occur within a defined region. By the shaping in the x-direction a linear characteristic curve of the sensed flux density along the entire travel $\Delta X$ and thus at each position of the travel $\Delta X$ a maximum resolution of the displacement sensor 1 is achieved. By the shaping in the y-direction the displacement sensor 1 is insensitive in relation to assembly tolerances.

The magnets 4, 5 are permanent magnets. The soft magnetic material of the magnet carrier 6 is preferably steel. The magnets 4, 5 can be formed as single magnets or integrally.

The flux density sensor 3 can be arranged both with single magnets as well with an integral shaping outside or partially within the receiving area A. Preferably, with the profile bodies 8 the profile height rises towards the outer walls. The magnets 4, 5 are preferably formed identically to each other.

The cross sectional profile Q can comprise a linear or nonlinear inner profile edge K. The cross sectional profile Q can be a square with two essentially right angles, or a triangle. The profile body 8 can be formed by drawing the cross sectional profile Q along a path in form of a rectangle half R, a semicircle H or an ellipse half E. This applies accordingly, if the profile body 8 is formed by several cross sectional profiles $Q_1$, $Q_2$ deviating from each other.

The invention claimed is:

1. A magnetic displacement sensor comprising:
a first magnet and a second magnet for generating a magnetic field, wherein the magnets are arranged in a state of rest substantially centrally along an x-axis, and the magnets are arranged in the state of rest substantially symmetrically to a y-axis; and
a magnetic flux density sensor, wherein the magnetic flux density sensor and the magnets are displaceable relative to each other in the direction of the x-axis, and the magnetic flux density sensor is configured for measuring a z-component ($B_z$) running in the direction of a z-axis of the flux density of the magnetic field,
wherein the magnets are configured in the direction of the x-axis in such a manner that the z-component ($B_z$) comprises an substantially linear characteristic curve in the region of a travel ($\Delta X$), and/or the magnets are formed in the direction of the y-axis in such a manner that the z-component ($B_z$) is substantially constant in the region of a transverse offset ($\Delta Y$).

2. A magnetic displacement sensor according to claim 1, wherein each magnet is configured in the direction of the x-axis in such a manner that a first z-measurement ($Z_1$) of the magnet running in the direction of the z-axis decreases towards the y-axis.

3. A magnetic displacement sensor according to claim 1, wherein each magnet is configured in the direction of the y-axis in such a manner that a second z-measurement ($Z_2$) of the magnet running in the direction of the z-axis decreases towards the x-axis.

4. A magnetic displacement sensor according to claim 1, wherein each magnet comprises a profile body having a cross sectional profile (Q) with an inner profile edge (K) that is drawn along a rectangle half (R).

5. A magnetic displacement sensor according to claim 1, wherein each magnet comprises a profile body having a cross sectional profile (Q) with an inner profile edge (K) that is drawn along a semicircle (H).

6. A magnetic displacement sensor according to claim 1, wherein each magnet comprises a profile body having a cross sectional profile (Q) with an inner profile edge (K) that is drawn along an ellipse half (E).

7. A magnetic displacement sensor according to claim 1, wherein each magnet comprises a profile body having a cross sectional profile (Q) with an inner profile edge (K) that is linear.

8. A magnetic displacement sensor according to claim 1, wherein each magnet comprises a profile body having a cross sectional profile (Q) that is a triangle.

9. A magnetic displacement sensor according to claim 1, wherein each magnet comprises a profile body having a cross sectional profile (Q) that is a square with two essentially right angles.

10. A magnetic displacement sensor according to claim 1, wherein each magnet comprises a profile body having a cross sectional profile (Q) with an inner profile edge (K) that is nonlinear.

11. A magnetic displacement sensor according to claim 10, wherein the cross sectional profile (Q) is a square with two essentially right angles.

12. A magnetic displacement sensor according to claim 1, wherein each magnet comprises a profile body having a first cross sectional profile ($Q_1$) with a first inner profile edge ($K_1$) and a second cross sectional profile ($Q_2$) with a second inner profile edge ($K_2$), which are drawn along sections of a path (R).

13. A magnetic displacement sensor according to claim 1, wherein each magnet comprises a profile body that is formed integrally with a bottom.

14. A magnetic displacement sensor according to claim 1, wherein the magnets are formed integrally with one another.

15. A magnetic displacement sensor according to claim 1, wherein the magnets are arranged on a soft magnetic magnet carrier.

16. A magnetic displacement sensor according to claim 1, wherein the flux density sensor is arranged at least partially in a receiving area (A) that is limited by the magnets.

* * * * *

UNITED STATES PATENT AND TRADEMARK OFFICE
CERTIFICATE OF CORRECTION

PATENT NO. : 8,427,136 B2
APPLICATION NO. : 12/919932
DATED : April 23, 2013
INVENTOR(S) : Hinkel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 431 days.

Signed and Sealed this
Eighth Day of September, 2015

Michelle K. Lee
*Director of the United States Patent and Trademark Office*